(12) United States Patent
Chen et al.

(10) Patent No.: US 12,349,134 B2
(45) Date of Patent: Jul. 1, 2025

(54) SIGNAL TRANSMISSION METHOD AND APPARATUS AND COMMUNICATION SYSTEM

(71) Applicant: FUJITSU LIMITED, Kawasaki (JP)

(72) Inventors: Zhe Chen, Beijing (CN); Lei Song, Beijing (CN); Jian Zhang, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 526 days.

(21) Appl. No.: 17/589,966

(22) Filed: Feb. 1, 2022

(65) Prior Publication Data

US 2022/0159691 A1 May 19, 2022

Related U.S. Application Data

(63) Continuation of application No. PCT/CN2019/100868, filed on Aug. 15, 2019.

(51) Int. Cl.
*H04W 76/20* (2018.01)
*H04L 1/1812* (2023.01)
*H04L 5/00* (2006.01)
*H04W 72/1273* (2023.01)
*H04W 72/23* (2023.01)

(52) U.S. Cl.
CPC ....... *H04W 72/1273* (2013.01); *H04L 1/1812* (2013.01); *H04L 5/0053* (2013.01); *H04W 72/23* (2023.01); *H04W 76/20* (2018.02)

(58) Field of Classification Search
CPC .................................................. H04W 76/20
USPC ........................................................ 370/329
See application file for complete search history.

(56) References Cited

U.S. PATENT DOCUMENTS

| | | | |
|---|---|---|---|
| 2013/0336160 A1 | 12/2013 | Yin et al. | |
| 2014/0092824 A1 | 4/2014 | He et al. | |
| 2019/0045489 A1 | 2/2019 | He et al. | |
| 2020/0177352 A1 | 6/2020 | Peng et al. | |
| 2021/0050950 A1* | 2/2021 | Zhou | H04W 72/21 |
| 2021/0160829 A1* | 5/2021 | Park | H04L 1/1854 |

FOREIGN PATENT DOCUMENTS

| | | | |
|---|---|---|---|
| CN | 104521304 A | 4/2015 | |
| CN | 104604175 A | 5/2015 | |
| CN | 106301702 A | 1/2017 | |
| CN | 107113108 A * | 8/2017 | ........... H04L 1/1671 |
| CN | 109391422 A | 2/2019 | |
| WO | 2017/160350 A1 | 9/2017 | |

OTHER PUBLICATIONS

3GPP TSG RAN WG1 Meeting #97 R1-1906758 Reno, NV, USA, May 13-17, 2019 Nokia, Nokia Shanghai Bell Support for SPS periodicities below a slot (Year: 2019).*
Extended European search report with the supplementary European search report and the European search opinion, issued by the European Patent Office for corresponding European Patent Application No. 19941696.7-1206, mailed on Jun. 28, 2022.
Nokia et al., "Support for SPS periodicities below a slot", Agenda Item: 7.2.6.7, 3GPP TSG-RAN WG1 Meeting #97, R1-1906758, Reno, NV, USA, May 13-17, 2019.
Wilus Inc, "On Shorter SPS PDSCH Periodicity for NR URLLC", Agenda Item: 7.2.6.7, 3GPP TSG-RAN WG1 Meeting #97, R1-1907388, Reno, USA, May 13-17, 2019.
Huawei et al., "Discussion on DL SPS enhancement", Agenda Item: 7.2.6.7, 3GPP TSG-RAN WG1 Meeting #97, R1-1906063, Reno, USA, May 13-17, 2019.
International Search Report and Written Opinion of the International Searching Authority issued by the China National Intellectual Property Administration for corresponding International Patent Application No. PCT/CN2019/100868, mailed on May 9, 2020, with an English translation.
NTT Docomo, Inc., "Physical layer enhancements for DL SPS", Agenda Item: 7.2.6.7, 3GPP TSG-RAN WG1 Meeting #97, R1-1906219, Reno, USA, May 13-17, 2019.
Examination Report issued by the Indian Patent Office for corresponding Indian Patent Application No. 202237005815, dated Jun. 21, 2022, with an English translation.
Notice of Reasons for Refusal issued by the Japan Patent Office for corresponding Japanese Patent Application No. 2022-507757, mailed on Apr. 4, 2023, with an English translation.
Media Tek Inc. "Multiple HARQ procedures and intra-UE UCI prioritization", Agenda Item: 7.2.6.2, 3GPP TSG-RAN WG1 Meeting #97, R1-1907724, Reno, Nevada, USA, May 13-17, 2019.
Notice of Preliminary Rejection issued by the Korean Intellectual Property Office for corresponding Korean Patent Application No. 10-2022-7004243, mailed on Jul. 5, 2024, with an English translation.
First Notification of Office Action and Search Report issued by the China National Intellectual Property Administration for corresponding Chinese Patent Application No. 201980099069.5, mailed on Feb. 22, 2025, with an English translation.
Dong et al., "Research on downlink HARQ feedback information scheduling for TD_LTE terminals", DOI: 10.3969/j.issn.1006-6403, Apr. 2013, with an English translation (slight title discrepancy in English translation), cited in CN SR.

* cited by examiner

*Primary Examiner* — Sibte H Bukhari
(74) *Attorney, Agent, or Firm* — Myers Wolin, LLC

(57) ABSTRACT

A signal transmission apparatus, configured in a terminal equipment, wherein the apparatus includes a generator configured to generate a first feedback signal at least according to a first set, the first set at least comprising two SPS PDSCH receptions, and the SPS PDSCH receptions in the first set corresponding to identical bandwidth parts (BWPs) or component carriers or serving cells or identical BWPs of identical serving cells, and a transmitter configured to transmit the first feedback signal.

17 Claims, 5 Drawing Sheets

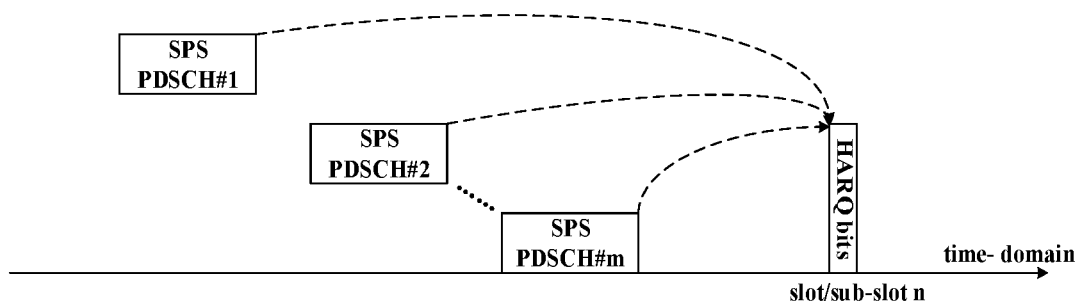

FIG. 4

```
                                                    ┌─501
┌─────────────────────────────────────────────────────────────────────────┐
│ a terminal equipment generates a first feedback signal at least according to a first │
│   set, the first set at least including two SPS PDSCH receptions, and the SPS      │
│  PDSCH receptions in the first set corresponding to identical bandwidth parts      │
│   (BWPs) or component carriers (CCs) or serving cells or identical BWPs of         │
│                            identical serving cells                                 │
└─────────────────────────────────────────────────────────────────────────┘
                                    │
                                    ▼                       ┌─502
┌─────────────────────────────────────────────────────────────────────────┐
│            the terminal equipment transmits the first feedback signal              │
└─────────────────────────────────────────────────────────────────────────┘
```

FIG. 5

SIGNAL TRANSMISSION METHOD AND APPARATUS AND COMMUNICATION SYSTEM

CROSS-REFERENCE TO RELATED APPLICATION

This application is a continuation application of International Application PCT/CN2019/100868 filed on Aug. 15, 2019, and designated the U.S., the entire contents of which are incorporated herein by reference.

FIELD

This disclosure relates to the field of communications.

BACKGROUND

Currently, an NR (New Radio) system supports that at most one semi-persistent scheduling (SPS) configuration is contained on a BWP (bandwidth part) in a serving cell. Moreover, according to demands of an existing service model, a period of the SPS is relatively long, and a minimum period thereof is 10 ms. However, as introduction of new service models, the NR system needs to be able to simultaneously activate multiple semi-persistent scheduling configurations on one BWP of a serving cell. In addition, a minimum transmission period of the SPS needs also to be greatly shortened. Therefore, when multiple SPS configurations on one BWP of a serving cell are activated simultaneously, their corresponding HARQ-ACK (hybrid automatic repeat request acknowledgement) information may possibly be transmitted in the same time unit. However, existing techniques are unable to solve such a problem.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that when at least two SPS configurations are activated simultaneously on the same BWP of the same serving cell, their corresponding HARQ-ACK information may possibly be transmitted in the same time unit. However, existing mechanisms are unable to handle such a situation. If there is no corresponding solution, periods, and time-domain position, etc. to which the SPS configurations correspond will be restricted; and furthermore, as HARQ-ACK information to which multiple active SPS configurations correspond are unable to be transmitted simultaneously, HARQ-ACK information to which some SPS configurations correspond may be delayed in transmission, thereby resulting in increase of latency of corresponding HARQ-ACK feedback, and affecting the system performance.

In order to solve at least one of the above problems or other similar problems, embodiments of this disclosure provide a signal transmission method and apparatus and a communication system, in which when at least two SPS configurations are activated simultaneously on the same BWP of the same cell, their corresponding HARQ-ACK information may be fed back in the same time unit, which may not only make a network side more flexible in configuring multiple SPSs (more flexible periods, and starting positions, etc.) in the same BWP of the same cell, but also lower latency of HARQ-ACK information to which the SPS configurations correspond.

According to a first aspect of the embodiments of this disclosure, there is provided a signal transmission method, wherein the method includes:
  generating a first feedback signal by a terminal equipment at least according to a first set, the first set at least including two SPS PDSCH receptions, and the SPS PDSCH receptions in the first set corresponding to identical bandwidth parts (BWPs) or component carriers (CCs) or serving cells or identical BWPs of identical serving cells; and
  transmitting the first feedback signal by the terminal equipment.

According to a second aspect of the embodiments of this disclosure, there is provided a signal reception method, wherein the method includes:
  transmitting SPS configuration information by a network device to a terminal equipment; and
  at least according to a third set, receiving, by the network device, a second feedback signal transmitted by the terminal equipment, the third set at least including feedback information to which two SPS PDSCH transmissions correspond, the SPS PDSCH transmissions corresponding to identical bandwidth parts (BWPs) or component carriers (CCs) or serving cells or identical BWPs of identical serving cells, and the SPS PDSCH transmissions corresponding to the SPS configuration information.

According to a third aspect of the embodiments of this disclosure, there is provided a signal transmission apparatus, configured in a terminal equipment, wherein the apparatus includes:
  a generating unit configured to generate a first feedback signal at least according to a first set, the first set at least comprising two SPS PDSCH receptions, and the SPS PDSCH receptions in the first set corresponding to identical bandwidth parts (BWPs) or component carriers (CCs) or serving cells or identical BWPs of identical serving cells; and
  a transmitting unit configured to transmit the first feedback signal.

According to a fourth aspect of the embodiments of this disclosure, there is provided a signal reception apparatus, configured in a network equipment, wherein the apparatus includes:
  a transmitting unit configured to transmit SPS configuration information to a terminal equipment; and
  a receiving unit configured to, at least according to a third set, receive a second feedback signal transmitted by the terminal equipment, the third set at least including feedback information to which two SPS PDSCH transmissions correspond, the SPS PDSCH transmissions corresponding to identical bandwidth parts (BWPs) or component carriers (CCs) or serving cells or identical BWPs of identical serving cells, and the SPS PDSCH transmissions corresponding to the SPS configuration information.

According to a fifth aspect of the embodiments of this disclosure, there is provided a terminal equipment, wherein the terminal equipment includes the apparatus described in the third aspect.

According to a sixth aspect of the embodiments of this disclosure, there is provided a network device, wherein the network device includes the apparatus described in the fourth aspect.

According to a seventh aspect of the embodiments of this disclosure, there is provided a communication system, wherein the communication system includes the terminal equipment described in the fifth aspect and the network device described in the sixth aspect.

According to another aspect of the embodiments of this disclosure, there is provided a computer readable program, which, when executed in a terminal equipment, will cause a computer to carry out the method described in the first aspect in the terminal equipment.

According to a further aspect of the embodiments of this disclosure, there is provided a storage medium storing a computer readable program, which will cause a computer to carry out the method described in the first aspect in a terminal equipment.

According to yet another aspect of the embodiments of this disclosure, there is provided a computer readable program, which, when executed in a network device, will cause a computer to carry out the method described in the second aspect in the network device.

According to still another aspect of the embodiments of this disclosure, there is provided a storage medium storing a computer readable program, which will cause a computer to carry out the method described in the second aspect in a network device.

One of the advantages of the embodiments of this disclosure exists in that according to one aspect of the embodiments of this disclosure, positions of bits of the HARQ-ACK information to which the PDSCHs (physical downlink shared channels) of the SPSs correspond, hence, the network device may determine a meaning of the HARQ-ACK information according to an order of the bits in the HARQ-ACK information, that is, according to the positions of the ACK/NACK bits in the HARQ-ACK information, the network device may determine whether the terminal equipment successfully receives a corresponding SPS PDSCH. And according to another aspect of the embodiments of this disclosure, an uplink signal (uplink resource) carrying the HARQ-ACK information is selected, hence, the HARQ-ACK information may use an uplink signal (uplink resource) of an appropriate time-frequency size for performing transmission, thereby ensuring reliability of the transmission, and improving the system performance.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 4 is a schematic diagram of an application scenario of an embodiment of this disclosure;

FIG. 5 is a schematic diagram of the signal transmission method of the first aspect of the embodiments of this disclosure;

DETAILED DESCRIPTION OF THE DISCLOSURE

Figure 1:
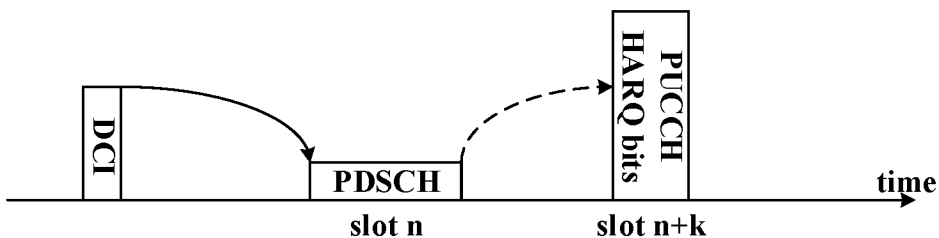
FIG. 1 is schematic diagram of dynamic scheduling.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the"

should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, an equipment accessing to a communication network and receiving network services via a network device, and may also be referred to as a "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Currently, in an NR system, a data signal reception feedback mechanism is introduced into physical layer downlink data transmission. Specifically, a UE will receive a PDSCH at a designated time-frequency position according to an indication (PDCCH, physical downlink control channel) of a base station, and at the same time, the UE needs to make corresponding HARQ feedback on the reception of the PDSCH. When the UE successfully decodes the PDSCH at the time-frequency position, the UE needs to feed back ACK to the base station; and when the UE fails in decoding the PDSCH at the time-frequency position, the UE needs to feed back NACK to the base station. By receiving the HARQ feedback from the UE, the base station may determine which downlink data need to be retransmitted accordingly, and at the same time, it may also determine quality of a downlink channel according to a ratio of ACK to NACK in the HARQ feedback, thereby adjusting a modulation and coding mode of downlink transmission accordingly.

In addition, in the NR system, scheduling of downlink data includes two modes: dynamic scheduling and semi-persistent scheduling (SPS). For the dynamic scheduling, one PDCCH schedules one corresponding PDSCH. And semi-persistent scheduling refers to that one PDCCH may activate transmission of a series of PDSCHs, and the series of PDSCHs are repeatedly transmitted at a period of P. When the UE receives activation signaling of semi-persistent scheduling, the UE obtains a time-frequency position of a first PDSCH according to the indication in the PDCCH and a pre-configured indication, thereafter, the UE proceeds with receiving or monitoring PDSCHs periodically in the time domain according to previously-stored PDCCH indication and related configuration information. When the UE receives deactivation signaling of the semi-persistent scheduling, it stops receiving or monitoring a corresponding PDSCH.

Regardless of whether it is dynamic scheduling or semi-persistent scheduling, corresponding to each PDSCH, the UE generally feeds back ACK or NACK information, that is, performing HARQ feedback.

For the dynamic scheduling, downlink control information (DCI) indicating the corresponding PDSCH includes a PDSCH-to-HARQ_feedback timing indicator field, which is used to indicate an offset k between the PDSCH and a PUCCH resource carrying a corresponding HARQ-ACK information bit (referred to as an HARQ bit in brief), as shown in FIG. 1. That is, when the PDSCH is in a slot n, its corresponding ACK or NACK feedback is transmitted in a slot n+k. And furthermore, the DCI also includes a PUCCH resource indicator field, which is used to indicate a PUCCH resource carrying a corresponding HARQ-ACK information bit.

Figure 2:
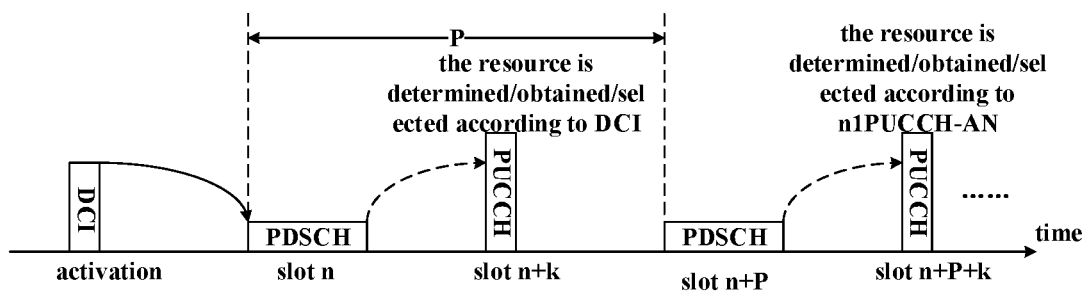
FIG. 2 is a schematic diagram of semi-persistent scheduling.

For the semi-persistent scheduling, the DCI used to activate the SPS contains a PDSCH-to-HARQ_feedback timing indicator field, which is used to indicate an offset k between each PDSCH and a PUCCH resource carrying a corresponding HARQ-ACK information bit, as shown in FIG. 2. Furthermore, in addition to the PDSCH directly indicated by the active DCI, if there exists only the HARQ feedback to which the PDSCH (without corresponding PDCCH) corresponds in a corresponding slot, the UE determines the PUCCH resource carrying corresponding HARQ-ACK information bit according to IE n1PUCCH-AN in the SPS configuration.

Figure 3:
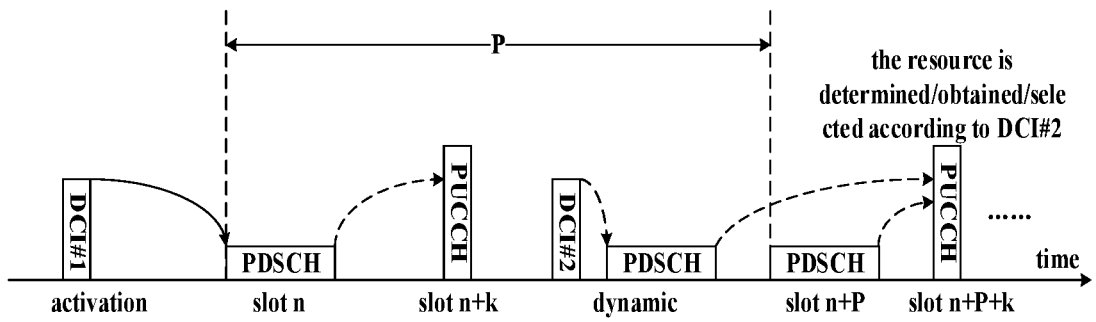
FIG. 3 is another schematic diagram of the semi-persistent scheduling.

When ACK/NACK feedback (i.e. HARQ-ACK information) of more than one PDSCHs is indicated to be transmitted in the same slot, in order to avoid power loss, the ACK/NACK information bit to which the semi-persistent scheduling corresponds and the ACK/NACK information bit to which the dynamic scheduling corresponds need to be multiplexed in the same uplink resource. As shown in FIG. 3, when the ACK/NACK feedback of the dynamic scheduling and the semi-persistent scheduling are indicated to be transmitted in the same slot, their corresponding contents of ACK/NACK feedback will be placed together, and are fed back in an uplink resource indicated by the dynamic scheduling (DCI#2).

Moreover, when HARQ-ACK information to which different PDSCHs correspond is transmitted in the same slot, the UE may determine an order of corresponding HARQ-ACK information bits according to a predefined rule, thereby generating a corresponding HARQ-ACK codebook. After the codebook is generated, the UE may transmit an uplink signal (PUCCH/PUSCH) for carrying the codebook.

In the description of the embodiments of this disclosure, the HARQ-ACK information, i.e. the HARQ feedback information, may include either ACK information bits, or NACK information bits.

A time unit is in unit of slot in FIGS. 1-3 and corresponding description. However, this disclosure is not limited thereto, and the time unit concerned in this disclosure may also be a symbol, or a sub-slot, or a frame, or a sub-frame, etc.

A scenario of an embodiment of this disclosure shall be described below in way of an example; however, the embodiment of this disclosure is not limited thereto.

FIG. 4 is a schematic diagram of an application scenario of the embodiment of this disclosure. As shown in FIG. 4, in the embodiment of this disclosure, for the convenience of description, a concept of a first set is defined, the first set at least including {SPS PDSCH#1, SPS PDSCH#2, SPS PDSCH#M}; where, one element denotes one SPS PDSCH reception, denoted as SPS PDSCH#m, m=1, 2, 3, . . . , M, (M>=2). Moreover, in the embodiment of this disclosure, SPS PDSCH#1, SPS PDSCH#2, SPS PDSCH#M correspond to identical BWPs or CCs or serving cells or identical BWPs of identical serving cells.

In the embodiment of this disclosure, one implementation is that the terminal equipment is configured to receive SPS PDSCH#m in a slot n-$K_m$, and SPS PDSCH#m is activated, that is, the SPS configuration to which SPS PDSCH#m corresponds is in an active state in the slot n-$K_m$, n refers to a slot for transmitting feedback information to which SPS PDSCH#m corresponds, and $K_m$ refers to a time-domain offset (PDSCH-to-HARQ-ACK-feedback timing value) between the PDSCH of SPS PDSCH#m and corresponding HARQ feedback, i.e. a slot interval between a slot where the SPS PDSCH#m reception is located and a slot where the corresponding HARQ-ACK information is located. It should be noted that transmission times of HARQ-ACK information to which all SPS PDSCH receptions in the first set correspond are in the same slot (i.e. slot n).

In the embodiment of this disclosure, another implementation is that the terminal equipment is configured to receive SPS PDSCH#m in a slot $n_m$, and SPS PDSCH#m is activated, that is, SPS configuration to which SPS PDSCH#m corresponds is in an active state in the slot $n_m$. Here, an (uplink) sub-slot to which SPS PDSCH#m corresponds is n'-$K'_m$, that is, a PDSCH ending symbol to which SPS PDSCH#m corresponds is in sub-slot n'-$K'_m$, n' refers to a sub-slot for transmitting feedback information to which SPS PDSCH#m corresponds, that is, a starting symbol of the uplink signal to which the feedback information corresponds is in sub-slot n', and $K'_m$ refers to a sub-slot interval (PDSCH-to-HARQ-ACK-feedback timing value) between a sub-slot corresponding to an ending symbol of the PDSCH to which SPS PDSCH#m corresponds and a sub-slot corresponding to an ending symbol of HARQ feedback to which SPS PDSCH#m corresponds. It should be noted that transmission times of HARQ-ACK information to which all SPS PDSCH receptions in the first set correspond are in the same sub-slot (i.e. sub-slot n').

The above description is given by taking slots and sub-slots as examples only, and the time units in the above description may also be subframes or symbols or frames.

Various implementations of the embodiments of this disclosure shall be described below with reference to the accompanying drawings. These implementations are illustrative only, and are not intended to limit this disclosure.

Embodiment of the First Aspect

The embodiment of the first aspect of this disclosure provides a signal transmission method, applicable to a terminal equipment. FIG. 5 is a schematic diagram of the signal transmission method of the first aspect of the embodiments of this disclosure. Referring to FIG. 5, the method includes:

operation 501: a terminal equipment generates a first feedback signal at least according to a first set, the first set at least including two SPS PDSCH receptions, and the SPS PDSCH receptions in the first set corresponding to identical bandwidth parts (BWPs) or component carriers (CCs) or serving cells or identical BWPs of identical serving cells; and operation 502: the terminal equipment transmits the first feedback signal.

According to the embodiment of this disclosure, on the same BWP or CC or serving cell or the same BWP of the same serving cell (i.e. the same BWP of a serving cell), the HARQ ACK information to which at least two SPS PDSCH receptions correspond may be fed back within the same time unit, thus, the network device may configure multiple SPSs in the same BWP or CC or serving cell or the same BWP of the same serving cell more flexibly, and latency of SPS feedback information may be lowered.

In the embodiments of this disclosure, the SPS PDSCH reception refers to that the terminal equipment monitors or receives a corresponding PDSCH according to SPS activated DCI and corresponding SPS configuration information. When the terminal equipment successfully decodes the SPS PDSCH at a corresponding time-frequency position, it feeds back ACK, and if the terminal equipment does not successfully decode the SPS PDSCH at the corresponding time-frequency position, it feeds back NACK. Here, the SPS activated DCI (i.e. DCI used for activating the SPS) refers to SPS activated DCI most close in the time domain for corresponding SPS configuration, that is, there is no other SPS activated DCI (belonging to the same SPS configuration) between the SPS activated DCI and its corresponding SPS PDSCH. In addition, the SPS activated DCI may be, for example, a DCI format scrambled by a CS-RNTI. For example, a new data indicator field in the SPS activated DCI used to enable a transport block is "0", that is, "a new data indicator field for the enabled transport block is set to '0'".

Taking FIG. 2 as an example, the SPS activated DCI is leftmost DCI, and the SPS PDSCH reception refers to that the UE monitors/receives a corresponding PDSCH in a slot n or receives/monitors a corresponding PDSCH in a slot n+P, or subsequently monitors/receives a corresponding PDSCH in a slot with P as a period (such as slot n+2P). Taking FIG. 3 as an example, the SPS activated DCI is DCI#1, and the SPS PDSCH reception refers to that the UE monitors/receives a corresponding PDSCH in a slot n or receives/monitors a corresponding PDSCH in a slot n+P, or subsequently monitors/receives a corresponding PDSCH in a slot with P as a period (such as slot n+2P). In the example of FIG. 3, DCI#2 is dynamic DCI, rather than the above-described SPS activated DCI, and the PDSCH scheduled by DCI#2 is not the PDSCH to which the above-described SPS PDSCH reception corresponds.

In at least one embodiment of the embodiments of this disclosure, the SPS PDSCH reception in the first set corresponds to identical HARQ-ACK codebooks, thereby making better use of system resources and ensuring transmission reliability. For example, the HARQ-ACK feedback of SPS PDSCH#1, SPS PDSCH#2, . . . , SPS PDSCH#M corresponds to identical HARQ-ACK codebooks, and the HARQ-ACK codebooks may be slot-based or sub-slot based; however, this disclosure is not limited thereto.

In an embodiment, HARQ-ACK codebook identifiers of the SPS configuration to which the SPS PDSCH reception (SPS PDSCH#1, SPS PDSCH#2, . . . , SPS PDSCH#M) in the first set corresponds are identical.

For example, in the first set, RRC IEs related to the semi-persistent scheduling to which all SPS PDSCH reception corresponds include 'codebook=slot-based', that is, HARQ feedback of all PDSCHs belongs to a slot-based HARQ-ACK codebook. Here, the slot-based refers to that the time-domain position of the uplink resource to which the HARQ-ACK information corresponds is determined by a time-domain indication in unit of slot.

For another example, in the first set, RRC IEs related to the semi-persistent scheduling to which all SPS PDSCH reception corresponds include codebook=sub-slot-based', that is, HARQ feedback of all PDSCHs belongs to a sub-slot-based HARQ-ACK codebook. Here, the sub-slot-based refers to that the time-domain position of the uplink resource to which the HARQ-ACK information corresponds is determined by a time-domain indication in unit of sub-slot.

For a further example, in the first set, RRC IEs related to the semi-persistent scheduling to which all SPS PDSCH reception corresponds include codebook=1', that is, HARQ-ACK information of all PDSCHs corresponds to a first HARQ-ACK codebook.

For yet another example, in the first set, RRC IEs related to the semi-persistent scheduling to which all SPS PDSCH reception corresponds include codebook=2', that is, HARQ-ACK information of all PDSCHs corresponds to a second HARQ-ACK codebook.

What described above are examples only; however, this disclosure is not limited thereto, and other similar examples may be derived based on the above examples, which are omitted herein.

In still another embodiment, HARQ-ACK codebook identifiers in the SPS activated DCI to which the SPS PDSCH reception (SPS PDSCH#1, SPS PDSCH#2, . . . , SPS PDSCH#M) in the first set corresponds are identical. Here, the SPS activated DCI corresponding to the SPS PDSCH reception refers to that the SPS PDSCH reception and the SPS activated DCI correspond to identical SPS configurations.

For example, the SPS activated DCI includes a field with a size of 1 bit; wherein when a codepoint is '0', it denotes a slot-based HARQ-ACK codebook, and when a codepoint is '1', it denotes a sub-slot-based HARQ-ACK codebook. Here, values of this field in the SPS activated DCI to which SPS PDSCH#1, SPS PDSCH#2, . . . , SPS PDSCH#M correspond are identical ('0'/'1').

For another example, the SPS activated DCI includes a field with a size of 2 bits; wherein when a codepoint is '00', it denotes an HARQ-ACK codebook 1, when a codepoint is '01', it denotes an HARQ-ACK codebook 2, when a codepoint is '10', it denotes an HARQ-ACK codebook 3, and when a codepoint is '11', it denotes an HARQ-ACK codebook 4. Here, values of this field in the SPS activated DCI to which SPS PDSCH#1, SPS PDSCH#2, SPS PDSCH#M correspond are identical.

In at least one embodiment of the embodiments of this disclosure, the above first feedback signal includes the feedback information to which the SPS PDSCH reception in the first set corresponds, and in the first feedback signal, an order of the feedback information to which the SPS PDSCH reception in the first set corresponds is related to at least one of the following modes (or is determined by at least one of the following modes):

a sequential order of a starting time-domain position or an ending time-domain position of a PDSCH to which the SPS PDSCH reception in the first set corresponds;

an ascending order or descending order of SPS configuration IDs to which the SPS PDSCH reception in the first set corresponds; and a sequential order of a starting time-domain position or an ending time-domain position of the SPS activated DCI to which the SPS PDSCH reception in the first set corresponds.

Therefore, the terminal equipment and the network device may determine a meaning of the HARQ-ACK information according to the sequential order of the bits of the HARQ-ACK information. That is, they may determine whether the corresponding SPS PDSCH reception in the first set is successful.

In addition, when the above order is related to the sequential order of the starting time-domain position or ending time-domain position of the PDSCH to which the SPS PDSCH reception in the first set corresponds, not only the starting/ending position of the PDSCH may be used to distinguish an order of the corresponding HARQ-ACK information bits, but also SPS PDSCH reception with an earlier PDSCH time-domain position is enabled to be processed preferentially to generate HARQ-ACK information bits earlier, and in line with hardware processing timing, thereby speeding up the processing procedure, and saving overhead of system resources.

In addition, when the above order is related to the ascending order or descending order of the SPS configuration IDs to which the SPS PDSCH reception in the first set corresponds, not only the SPS configuration IDs to which PDSCH corresponds may distinguish the order of the corresponding HARQ-ACK information bits, but also PDSCHs to which different SPS configuration IDs correspond may be made to have different priority levels, that is, when the UE is unable to transmit HARQ-ACK bits to which all SPS PDSCH receptions in the first set correspond, a part of the bits may be removed according to the sequential order, so that the number of bits the feedback information is matched with corresponding transmission resources.

In addition, when the above order is related to the sequential order of the starting time-domain position or ending time-domain position of the SPS activated DCI to which the SPS PDSCH reception in the first set corresponds, not only the SPS activated DCI to which the PDSCH corresponds may be made to distinguish the order of the corresponding HARQ-ACK information bits, but also PDSCHs to which different SPS activated DCI corresponds may be made to have different priority levels, that is, when the UE is unable to transmit HARQ-ACK information bits to which all SPS PDSCH receptions in the first set correspond, a part of the bits may be removed according to the sequential order, so that the number of bits the feedback information is matched with corresponding transmission resources.

Similar to the above time unit, the above time-domain position may be one of a frame, a subframe, a slot, a sub-slot, and a symbol, and this disclosure is not limited thereto.

For example, assuming that the feedback information bits to which SPS PDSCH#1, SPS PDSCH#2, . . . , SPS PDSCH#M correspond are $O_1, O_2, \ldots, O_M$, respectively. In the first feedback signal, assuming that the order of the feedback information bits is $\{O_1, O_2, \ldots, O_M\}$ (from $O_1$ to $O_M$), the order is determined by one of the following methods:

method 1: a starting or ending position of the PDSCH signal, that is, the above order is determined by the starting/ending position of the PDSCH signal to which SPS PDSCH#m corresponds; for example, a starting symbol of the PDSCH signal to which SPS PDSCH#m corresponds is StartPDSCH# m, then, a time-domain ascending order arrangement of starting positions according to corresponding PDSCH signals refers to: StartPDSCH#1>=StartPDSCH#2>= . . . >= StartPDSCH#M;

and a time-domain descending order arrangement of starting positions according to corresponding PDSCH signals refers to: StartPDSCH#1<=StartPDSCH#2 <= . . . <=StartPDSCH#M;

method 2: SPS configuration ID, that is, the above order is determined by a size of the SPS configuration ID (SPS config#m) to which SPS PDSCH#m corresponds, for example, an ascending order according to a corresponding SPS configuration ID: SPS config#1>=SPS config#2>= . . . >=SPS config#M;

a descending order according to a corresponding SPS configuration ID: SPS config#1<=SPS config#2<= . . . <=SPS config#M;

method 3: the starting or ending position of the SPS activated DCI, that is, the above order is determined by the starting or ending position of the SPS activated DCI to which SPS PDSCH#m corresponds, for example, a starting symbol of the SPS activated DCI to which SPS PDSCH#m corresponds is StartPDCCH#m, then, a time-domain ascending order arrangement according to a starting position of a corresponding PUCCH signal refers to: StartPDCCH#1>=StartPDCCH#2>= . . . >=StartPDCCH#M;

and a time-domain descending order arrangement according to the starting position of the corresponding PUCCH signal refers to: StartPDCCH#1<=StartPDCCH#2<= . . . <=StartPDCCH#M.

Here, the SPS activated DCI to which SPS PDSCH#m corresponds refers to SPS activated DCI that is most close to SPS PDSCH#m in the time domain and corresponds to identical SPS configurations.

The above three methods may be used separately or in a combined manner. For example, the starting positions of the PDSCH are compared first, and if they are identical, sizes of the SPS configuration IDs are compared, and vice versa; for another example, sizes of the SPS configuration IDs are compared first, and then positions of the SPS activated DCI are compared, and vice versa.

In the above operation 501 of the embodiment of this disclosure, in at least one embodiment, the terminal equipment may generate the first feedback signal according to the first set and a maximum number of HARQ-ACK information bits. Here, the maximum number of HARQ-ACK information bits refers to a maximum number of HARQ-ACK information bits related to SPS in an uplink signal (such as a PUCCH).

In an embodiment, the maximum number of HARQ-ACK information bits may be indicated by RRC (radio resource control) signaling, that is, it is configured by the network device via RRC signaling.

For example, the network device transmits RRC signaling to the terminal equipment to indicate the terminal equipment to allow to transmit $N_{max}$ SPS-related HARQ feedback bits in at most one uplink resource/signal in one uplink resource, hence, $N_{max}$ is the above maximum number of HARQ-ACK information bits, and, when a total number of HARQ-ACK bits to which all SPS PDSCH receptions in the first set correspond is less than or equal to $N_{max}$, the first feedback signal includes SPS HARQ feedback bits to which all SPS PSDCH receptions in the first set correspond;

and when the total number of HARQ-ACK bits to which all SPS PDSCH receptions in the first set correspond is greater than $N_{max}$, the first feedback signal includes at most $N_{max}$ HARQ-ACK bits to which the SPS PDSCH receptions in the first set correspond. In such a case, HARQ-ACK information to which only a part of SPS PDSCH receptions in the first set correspond is included in the first feedback signal.

In the embodiment of this disclosure, the terminal equipment may determine the above part of the SPS PDSCH receptions according to the sequential order of the starting/ending time-domain positions of the PDSCHs to which the SPS PDSCH receptions in the first set correspond. For example, the first feedback signal only includes feedback information (HARQ-ACK bits) of SPS PDSCH receptions with starting positions of corresponding PDSCHs being foremost, so that the number of transmitted bits is less than or equal to the $N_{max}$.

In the embodiment of this disclosure, the terminal equipment may also determine the above part of SPS PDSCH receptions according to the ascending/descending order of the SPS configuration IDs to which the SPS PDSCH receptions in the first set correspond. For example, the first feedback signal only includes feedback information (HARQ-ACK bits) of PDSCH receptions with corresponding SPS configuration IDs being relatively small, so that the number of transmitted bits is less than or equal to the $N_{max}$.

In the embodiment of this disclosure, the terminal equipment may also determine the above part of SPS PDSCH receptions according to the sequential order of the starting/ending time-domain positions of the SPS activated DCI to which the SPS PDSCH receptions in the first set correspond. For example, the first feedback signal only includes feedback information (HARQ-ACK bits) of PDSCH receptions with corresponding SPS activated DCI being earlier, so that the number of transmitted bits is less than or equal to the $N_{max}$.

The above three methods may be used separately or in a combined manner. For example, the starting positions of the PDSCH are compared first, and if they are identical, sizes of the SPS configuration IDs are compared, and vice versa; for another example, sizes of the SPS configuration IDs are compared first, and then positions of the SPS activated DCI are compared, and vice versa; however, this disclosure is not limited thereto.

In another embodiment, the above maximum number of HARQ-ACK information bits may also be related to a capacity of the first feedback signal. That is, allowing to transmit at most $N_{max}$ HARQ feedback bits related to the SPS is not indicated by RRC signaling, but is related to the capacity of the first feedback signal, such as being equal. Such a capacity is related to time-frequency domain resources, a modulation coding scheme (MCS) and/or a code rate of the above first feedback signal, which shall not be described herein any further. Thus, it may be avoided that additional indication signaling indicates the maximum number of HARQ-ACK information bits, thereby reducing overhead of system resources.

In operation 501 of the embodiment of this disclosure, in at least one embodiment, the terminal equipment may generate the above first feedback signal according to the first set and a maximum number of ACKs related to the HARQ-ACK information. Here, the HARQ-ACK information refers to the HARQ-ACK information related to the SPS.

In an embodiment, the maximum number of ACKs related to the HARQ-ACK information refers to a maximum number of ACKs related to HARQ-ACK information in an uplink signal (such as a PUCCH), which may be indicated by RRC signaling, that is, it may be configured by the network device via RRC signaling.

For example, the network device transmits the RRC signaling to the terminal equipment, indicating that the terminal equipment is allowed to transmit at most P 'ACKs' related to the SPS in an uplink resource, that is, it indicates the terminal equipment that the HARQ information to which at most P valid SPS PDSCH receptions correspond may be ACK, and HARQ information to which other SPS PDSCH receptions in the first set correspond is NACK. Therefore, the number of ACKs that may be included in the feedback information is 0, 1, 2, . . . , P. Assuming that the number of corresponding HARQ feedback bits related to the SPS in the first feedback signal is N, states in which feedback may occur are 1, $A_1^N$, $A_2^N$, . . . , $A_P^N$, $A_1^N$=N, $A_2^N$=N*(N−1), $A_3^N$=N*(N−1)*(N−2), $A_P^N$=N*(N−1)*(N−2)* . . . *(N−P+1), respectively. Therefore, the terminal equipment does not need to generate N bit of HARQ-ACK information in the first feedback signal, but generates a certain number of bits corresponding to all the above states that may possibly occur, that is, the number of bits generated in the first feedback signal is: $\log_2(\lceil \sum_{l=0}^{P} A_l^N \rceil)$, (P=0,1,2 . . . ). In this way, the RRC signaling may flexibly configure the number of ACKs, so that HARQ-ACK information of more SPS PDSCHs may be feedback in identical time units. In addition, limiting the number of ACKs may greatly reduce possible combinations of feedback information, thereby saving overhead of information bits needed in HARQ feedback.

In another embodiment, the above maximum number of ACKs related to the HARQ-ACK information is predefined, that is, allowing to transmit at most P ACKs related to the SPS is not indicated by RRC but is predefined, such as 2. In this way, additional indication signaling (used for indicating the number of ACKs) may be avoided and signaling overhead may be saved.

According to the above methods of the embodiments of this disclosure, in the HARQ-ACK information, the positions of the HARQ-ACK information bits to which the SPS PDSCHs correspond may be determined. Therefore, the network device and the terminal equipment may determine the meaning of the feedback information according to the sequential order of the HARQ-ACK information bits.

In the embodiments of this disclosure, in at least one embodiment, the above first feedback signal only includes HARQ-ACK information to which a PDSCH reception not corresponding to a PDCCH (PDSCH without corresponding PDCCH) corresponds, but does not include HARQ-ACK information to which a PDSCH reception corresponding to a PDCCH (PDSCH with corresponding PDCCH) corresponds. Here, the PDSCH without corresponding PDCCH refers to that there exists no PDCCH directly scheduling the PDSCH, such as a PDSCH in the SPS other than an initial PDSCH indicated by the SPS activated DCI. Here, the initial PDSCH refers to a first corresponding PDSCH after the SPS activated DCI. Therefore, as there exists no directly corresponding PDCCH, the resource indication of the first feedback signal is unable to be directly provided by the PDCCH, and the resource may be an uplink resource to which an SPS PDSCH reception in the first set corresponds, or may be an uplink resource in a second set, the uplink resource in the second set may be related to a size of the HARQ-ACK information to which the SPS PDSCH reception in the first set corresponds, particular implementation of which being to be described below.

In the embodiments of this disclosure, in at least one embodiment of operation 502, the terminal equipment may transmit the above first feedback signal by using a first uplink resource, the first uplink resource may be a configured uplink resource to which an SPS PDSCH reception in the first set corresponds.

For example, the SPS PDSCH reception to which the first uplink resource corresponds may be an SPS PDSCH reception with a maximum or minimum SPS configuration ID to which the SPS PDSCH reception in the first set corresponds. Assuming that a configured PUCCH resource for HARQ-ACK feedback to which SPS PDSCH#m in the first set corresponds is $PUCCH_m$ and an SPS configuration ID to which SPS PDSCH#m corresponds is $SPS_m$, the terminal equipment may transmit the first feedback signal according to $PUCCH_i$; where, $i = \mathrm{argmax}_{m=1}^{M}\{SPS_m\}$, or $i = \mathrm{argmin}_{m=1}^{M}\{SPS_m\}$.

For another example, the SPS PDSCH reception to which the first uplink resource corresponds may be an SPS PDSCH reception with an earliest or latest PDSCH starting time-domain position or ending time-domain position to which the SPS PDSCH reception in the first set corresponds. Assuming that a configured PUCCH resource for HARQ-ACK feedback to which SPS PDSCH#m in the first set corresponds is $PUCCH_m$ and a PDSCH starting time-domain position (a symbol/a slot/a sub-slot) to which SPS PDSCH#m corresponds is $t_m^{PDSCH,Start}$, the terminal equipment may transmit the first feedback signal according to $PUCCH_i$; where, $i = \mathrm{argmax}_{m=1}^{M}\{t_m^{PDSCH,Start}\}$, or $t = \mathrm{argmin}_{m=1}^{M}\{t_m^{PDSCH,Start}\}$.

For a further example, the SPS PDSCH reception to which the first uplink resource corresponds may be an SPS PDSCH reception with an earliest or latest configured HARQ PUCCH resource starting time-domain position or ending time-domain position to which the SPS PDSCH reception in the first set corresponds. Assuming that the configured PUCCH resource for HARQ-ACK feedback to which SPS PDSCH#m in the first set corresponds is $PUCCH_m$ (such as a PUCCH resource indicated by an indication IE: n1PUCCH-AN about HARQ PUCCH resource in corresponding SPS configuration SPS-config). In addition, the starting time-domain position (symbol/slot/sub-slot) of $PUCCH_m$ is $t_m^{PUCCH,Start}$, and the terminal equipment may transmit the first feedback signal according to $PUCCH_i$; where, $t = \mathrm{argmax}_{m=1}^{M}\{t_m^{PDSCH,Start}\}$, or $t = \mathrm{argmin}_{m=1}^{M}\{t_m^{PDSCH,Start}\}$.

For yet another example, the SPS PDSCH reception to which the first uplink resource corresponds may be an SPS PDSCH reception with a PUCCH to which the SPS PDSCH reception in the first set corresponds satisfying a predefined timeline. Assuming that the configured PUCCH resource for HARQ-ACK feedback to which SPS PDSCH#m in the first set corresponds is $PUCCH_m$. In addition, the ending time-domain position (symbol/slot/sub-slot) of the PDSCH to which SPS PDSCH#m corresponds is $t_m^{PDSCH,End}$. In addition, a PUCCH starting time-domain position (symbol/slot/sub-slot) used for carrying corresponding HARQ-ACK information to which SPS PDSCH#m corresponds is $t_m^{PUCCH,Start}$, and when $t_i^{PUCCH,Start}-\max_{m=1}^{M}\{t_m^{PDSCH,End}\} \geq T$, the terminal equipment may transmit the first feedback signal according to $PUCCH_i$; where, T is a predefined threshold, for example, it is identical to $N_2$ timeline, that is, it is equivalent to a minimum time-domain interval between PDSCH transmission and corresponding HARQ-ACK feedback, and the threshold is related to a capability and/or a (corresponding uplink) sub-carrier spacing (SCS).

For still another example, the SPS PDSCH reception to which the first uplink resource corresponds may be an SPS PDSCH reception with a capacity of a PUCCH to which the SPS PDSCH reception in the first set corresponds being greater than or equal to a corresponding total payload size. Assuming that the configured PUCCH resource for HARQ-ACK feedback to which SPS PDSCH#m in the first set corresponds is $PUCCH_m$. In addition, the number of the HARQ information bits to which SPS PDSCH#m corresponds is $N_m$. In addition, a capacity of the PUCCH used for carrying corresponding HARQ-ACK information to which SPS PDSCH#m corresponds is $C_m$, and when $C_i \geq \Sigma_{m=1}^{M} N_m$, the terminal equipment may transmit the first feedback signal according to $PUCCH_i$.

In this example, if the capacity of the PUCCH is not greater than or equal to the total payload size, the terminal equipment may transmit the first feedback signal according to a PUCCH resource with a largest capacity. That is, the SPS PDSCH reception to which the first uplink resource corresponds may be an SPS PDSCH reception with a largest PUCCH capacity to which the SPS PDSCH reception in the first set corresponds. That is, if the SPS PDSCH in the first set does not have a corresponding $PUCCH_m$ satisfying the above condition, the terminal equipment may transmit the first feedback signal according to $PUCCH_{i'}$; where, $i'=\text{argmax}_{m=1}^{M}\{C_m\}$.

In the embodiment of this disclosure, the above PUCCH capacity is related to the time-frequency domain resource size, modulation scheme, and/or code rate of the PUCCH resource, and this disclosure is not limited thereto.

In the embodiment of this disclosure, in at least one embodiment of operation 502, the terminal equipment may transmit the above first feedback signal by using (or according to) a second uplink resource. The second uplink resource belongs to the second set, and the second uplink resource is related to the size of the HARQ-ACK information to which the SPS PDSCH reception in the first set corresponds.

Taking that the second uplink resource is a PUCCH resource as an example, the second set may include {PUCCH#1, PUCCH#2, . . . , PUCCH#K}; where, one element is denoted as PUCCH#k, k=1, 2, 3, . . . , K, (K>=1). And, for example, uplink resources in the second set may be arranged in an ascending order or descending order of resource capacities.

For example, assuming that the number of HARQ feedback bits to which SPS PDSCH#m in the first set corresponds is $N_m$. In addition, a PUCCH resource capacity to which PUCCH#k corresponds is $C_k$, and when $C_i \geq \Sigma_{m=1}^{M} N_m$, the terminal equipment may transmit the first feedback signal according to $PUCCH_i$. If there is no PUCCH resource satisfying the above conditions in the second set, the terminal equipment may transmit the first feedback signal according to $PUCCH_{k'}$; where, $k'=\text{argmax}_{k=1}^{K}\{C_k\}$.

For another example, assuming that payload size ranges to which the second set {PUCCH#1, PUCCH#2, . . . , PUCCH#K} corresponds are PUCCH#1→{P0, P1}, PUCCH#2→{$P_1, P_2$}, . . . , PUCCH#K→{$P_{K-1}, P_K$}, respectively. When $P_{k'-1} < \Sigma_{m=1}^{M} N_m \leq P_{k'}$, the terminal equipment may transmit the first feedback signal according to $PUCCH_{k'}$. If there is no $PUCCH_{k'}$ satisfying the above conditions, the terminal equipment transmits the first feedback signal according to $PUCCH_{k''}$; where, $k''=\text{argmax}_{k=1}^{K}\{P_k\}$.

In the embodiment of this disclosure, the above second uplink resource may be indicated via RRC signaling, that is, the terminal equipment may transmit the first feedback signal by using the second uplink resource according to the RRC signaling. The RRC signaling indicates the terminal equipment to transmit the HARQ-ACK information to which the SPS PSDCH reception in the first set corresponds by using uplink resource in the second set. For example, an IE name of the RRC signaling is "SPS-HARQ-multiplexing-PUCCH", which may be configured as "enable" or "disable" or may not be configured (for example, being not configured is equivalent to "disable"). Under the condition that the RRC is enabled, the terminal equipment may transmit the HARQ information to which the SPS PDSCH reception in the first set corresponds according to the uplink resource in the second set; and if the indication of the RRC signaling is disabled, the terminal equipment needs to transmit the first feedback signal according to the HARQ PUCCH resource corresponding to the SPS PDSCH reception, and a specific method of implementation is as described above.

In the embodiment of this disclosure, in at least one embodiment of operation 502, the terminal equipment may transmit the first feedback signal according to RRC signaling. For example, an enabled state of the RRC signaling indicates that the terminal equipment is allowed to multiplex feedback information to which at least two SPS PDSCHs on the same BWP correspond in the same uplink resource. For example, an IE name of the RRC signaling is 'SPS-HARQ-multiplexing', which may be configured to be "enable" or "disable" or may not be configured (for example, being not configured is equivalent to "disable"). That is, when the RRC signaling indicates a corresponding enabled state, the terminal equipment may transmit the first feedback signal; and if it is disabled (or when it is not configured), the terminal equipment is unable to transmit the first feedback signal.

In the embodiments of this disclosure, in at least one embodiment of operation 502, the terminal equipment may transmit the first feedback signal according to a reported user equipment capability (UE capability). This capability refers to that the terminal equipment is able to multiplex feedback information to which at least two SPS PDSCHs on the same BWP correspond in the same uplink resource. The capability may be related to all CCs/serving cells of the terminal equipment, or the capability may be reported by each CC/serving cell separately, and this disclosure is not limited thereto. When the terminal equipment possesses this capability and reports corresponding information to the network device, the terminal equipment may transmit the first feedback signal in the method described in this text.

According to the above method in the embodiments of this disclosure, the uplink resource (uplink signal) used to carry the above feedback information is selected, so that the feedback information may be transmitted on the uplink signal with an appropriate time-frequency size, which ensures reliability of transmission and improves the system performance.

With the method of the embodiment of this disclosure, the network device may configure multiple SPSs (more flexible period, starting position) in the same BWP or CC or serving cell or the same BWP of the same serving cell more flexibly, and latency of SPS transmission feedback information may be lowered.

Embodiment of the Second Aspect

The embodiment of the second aspect of this disclosure provides a signal reception method, which is applicable to a network device, and is processing at a network side corresponding to the method of the embodiment of the first aspect, with contents identical to those in the embodiment of the first aspect being not going to be repeated any further.

Figure 6:
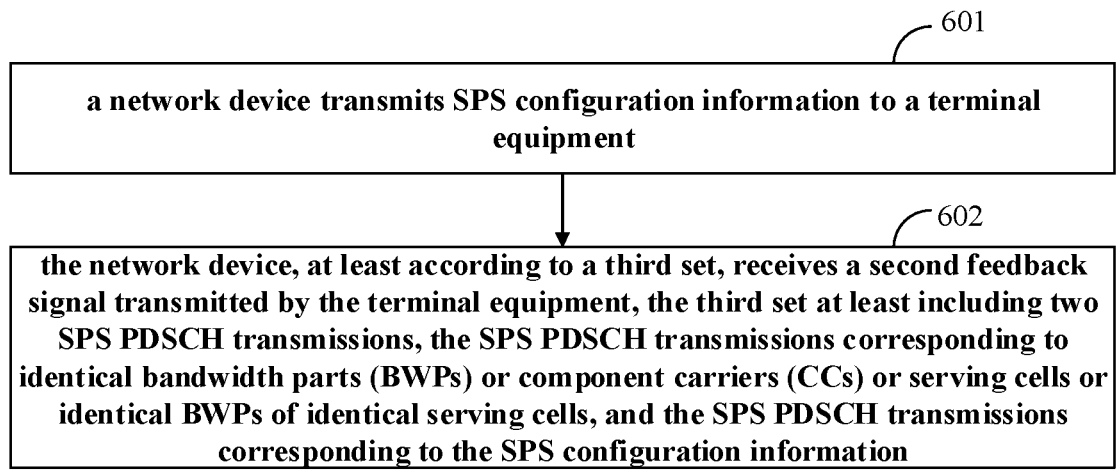
FIG. 6 is a schematic diagram of the signal reception method of the second aspect of the embodiments of this disclosure.

FIG. 6 is a schematic diagram of the signal reception method of the embodiment of the second aspect of this disclosure. As shown in FIG. 6, the method includes:
- operation 601: a network device transmits SPS configuration information to a terminal equipment; and
- operation 602: the network device, at least according to a third set, receives a second feedback signal transmitted by the terminal equipment, the third set at least including two SPS PDSCH transmissions, the SPS PDSCH transmissions corresponding to identical bandwidth parts (BWPs) or component carriers (CCs) or serving cells or identical BWPs of identical serving cells, and the SPS PDSCH transmissions corresponding to the SPS configuration information.

In the embodiment of this disclosure, the SPS PDSCH transmission refers to that the network device is able to (may) transmit a corresponding PDSCH according to a content indicated by transmitted SPS activated DCI and corresponding SPS configuration information. It should be noted that the network device may not necessarily transmit the above PDSCH, but the terminal equipment may monitor/receive the PDSCH at a corresponding position.

In the embodiment of this disclosure, in operation 601, the network device may transmit SPS configuration information to the terminal equipment, and contents and a method of transmitting the SPS configuration information are not limited in this disclosure, and related technologies may be referred to.

In the embodiment of this disclosure, the SPS PDSCH transmission in the third set corresponds to the same HARQ-ACK codebook.

In at least one embodiment, that the SPS PDSCH transmission in the third set corresponds to the same HARQ-ACK codebook refers to that HARQ-ACK codebook identifiers of the SPS configuration to which the SPS PDSCH transmission in the third set corresponds are identical; or, HARQ-ACK codebook identifiers in the SPS activated DCI to which the SPS PDSCH transmission in the third set corresponds are identical.

In the embodiment of this disclosure, the second feedback signal includes HARQ-ACK information to which the SPS PDSCH transmission in the third set corresponds, and an order of the feedback information to which the SPS PDSCH transmission in the third set corresponds in the third feedback signal is related to at least one of the following modes:
- a sequential order of a starting time-domain position or an ending time-domain position of a PDSCH to which the SPS PDSCH transmission in the third set corresponds;
- an ascending order or descending order of SPS configuration IDs to which the SPS PDSCH transmission in the third set corresponds; and
- a sequential order of a starting time-domain position or an ending time-domain position of the SPS activated DCI to which the SPS PDSCH transmission in the third set corresponds.

In the embodiment of this disclosure, the HARQ-ACK information to which the SPS PDSCH transmission in the third set corresponds may be transmitted in the same sub-slot.

In an embodiment of the embodiments of this disclosure, in operation 602, that the network device receives the second feedback signal according to at least the third set includes: that the network device receives the second feedback signal according to the third set and a maximum number of HARQ-ACK information bits.

In at least one embodiment, the maximum number of HARQ-ACK information bits refers to a maximum number of HARQ-ACK information bits related to the SPS in an uplink signal.

In at least one embodiment, the maximum number of HARQ-ACK information bits is indicated by RRC signaling, or the maximum number of HARQ-ACK information bits is related to a capacity of the second feedback signal.

In another embodiment of the embodiments of this disclosure, in operation 602, that the network device receives the second feedback signal at least according to the third set includes: that the network device receives the second feedback signal according to the third set and a maximum number of ACKs related to the HARQ-ACK information.

In at least one embodiment, the above HARQ-ACK information is HARQ-ACK information related to the SPS.

In at least one embodiment, the above maximum number of ACKs related to the HARQ-ACK information is indicated by RRC signaling, or is predefined.

In an embodiment of the embodiments of this disclosure, in operation 602, that the network device receives the second feedback signal includes: that the network device receives the second feedback signal on a third uplink resource, the third uplink resource being an uplink resource to which a SPS PDSCH transmission in the third set corresponds.

In an embodiment, the SPS PDSCH transmission to which the third uplink resource corresponds is at least one of the following:
- an SPS PDSCH transmission with a maximum or minimum SPS configuration ID to which the SPS PDSCH transmission in the third set corresponds;
- an SPS PDSCH transmission with an earliest or latest PDSCH starting time-domain position or ending time-domain position to which the SPS PDSCH transmission in the third set corresponds;
- an SPS PDSCH transmission with an earliest or latest PUCCH starting time-domain position or ending time-domain position to which the SPS PDSCH transmission in the third set corresponds;
- an SPS PDSCH transmission with a PUCCH satisfying a predefined timeline to which the SPS PDSCH transmission in the third set corresponds;
- an SPS PDSCH transmission with a PUCCH capacity greater than or equal to a corresponding total payload size to which the SPS PDSCH transmission in the third set corresponds; and
- an SPS PDSCH transmission with a largest PUCCH capacity to which the SPS PDSCH transmission in the third set corresponds.

In another embodiment of the embodiments of this disclosure, in operation 602, that the network device receives the second feedback signal includes: that the network device receives the second feedback signal on a fourth uplink resource, the fourth uplink resource belonging to a fourth set and being related to a size of the HARQ-ACK information to which the SPS PDSCH transmission in the third set corresponds.

In at least one embodiment, uplink resources in the fourth set are arranged in an ascending order or descending order of resource capacities.

In at least one embodiment, that the network device receives the second feedback signal on the fourth uplink resource includes: that the network device receives the second feedback signal on the fourth uplink resource according to RRC signaling.

In an embodiment of the embodiments of this disclosure, the second feedback signal only includes HARQ-ACK information to which PDSCH transmissions in SPS PDSCH transmissions in the third set not corresponding to PDCCHs correspond.

In an embodiment of the embodiments of this disclosure, in operation 602, that the network device receives the second feedback signal includes: that the network device receives the second feedback signal according to RRC signaling.

In an embodiment of the embodiments of this disclosure, in operation 602, that the network device receives the second feedback signal includes: that the network device receives the second feedback signal according to a received user equipment capability (UE capability).

In the embodiment of this disclosure, the second feedback signal corresponds to the first feedback signal of the embodiment of the first aspect, the SPS PDSCH transmission corresponds to the SPS PDSCH reception of the embodiment of the first aspect, the third set corresponds to the first set of the embodiment of the first aspect, and the fourth set correspond to the second set of the embodiments of the first aspect. Implementations of the second feedback signal, SPS PDSCH transmission, third set and fourth set of the embodiments of this disclosure are similar to those of the first feedback signal, SPS PDSCH reception, first set and the second set of the embodiment of the first aspect, which shall not be repeated herein any further.

With the method of the embodiment of this disclosure, the network device may configure multiple SPSs (more flexible period, starting position) in the same BWP or CC or serving cell or the same BWP of the same serving cell more flexibly, and latency of SPS transmission feedback information may be lowered.

Embodiment of the Third Aspect

The embodiment of the third aspect of this disclosure provides a signal transmission apparatus, configured in a terminal equipment. As principles of the apparatus for solving problems are similar to that of the method of the embodiment of the first aspect, reference may be made to the implementations of the method of the embodiment of the first aspect for implementations of this apparatus, with identical parts being not going to be described herein any further.

Figure 7:
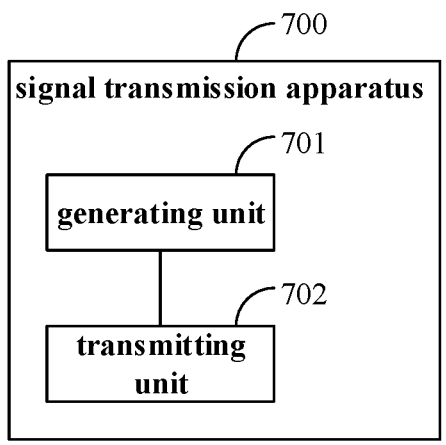
FIG. 7 is a schematic diagram of the signal transmission apparatus of the third aspect of the embodiments of this disclosure.

FIG. 7 is a schematic diagram of the signal transmission apparatus 700 of this embodiment. As shown in FIG. 7, the apparatus 700 includes a generating unit 701 and a transmitting unit 702. The generating unit 701 generates a first feedback signal at least according to a first set, the first set at least including two SPS PDSCH receptions, and the SPS PDSCH receptions in the first set corresponding to identical bandwidth parts (BWPs) or component carriers (CCs) or serving cells or identical BWPs of identical serving cells. And the transmitting unit 702 transmits the first feedback signal.

In the embodiment of this disclosure, the SPS PDSCH receptions refer to that the terminal equipment monitors or receives corresponding PDSCHs according to an SPS activated DCI indication and corresponding SPS configuration information.

In at least one embodiment, the HARQ-ACK information to which the SPS PDSCH receptions in the first set correspond is transmitted in identical sub-slots.

In at least one embodiment, the SPS PDSCH receptions in the first set correspond to identical HARQ-ACK codebooks.

In an embodiment, that the SPS PDSCH receptions in the first set correspond to identical HARQ-ACK codebooks refers to: HARQ-ACK codebook identifications of the SPS configuration to which the SPS PDSCH receptions in the first set correspond are identical; or, HARQ-ACK codebook identifications in the SPS activated DCI to which the SPS PDSCH receptions in the first set correspond are identical.

In at least one embodiment, the first feedback signal includes HARQ-ACK information to which the SPS PDSCH receptions in the first set correspond, and orders of the feedback information to which the SPS PDSCH receptions in the first set correspond in the first feedback signal are related to at least one of the following manners:

a sequential order of starting time-domain positions or ending time-domain positions of PDSCHs to which the SPS PDSCH receptions in the first set correspond;

an ascending order or descending order of SPS configuration IDs to which the SPS PDSCH receptions in the first set correspond; and a sequential order of starting time-domain positions or ending time-domain positions of SPS activated DCI to which the SPS PDSCH receptions in the first set correspond.

In at least one embodiment, that the generating unit 701 generates a first feedback signal at least according to a first set includes:

that the generating unit 701 generates the first feedback signal according to the first set and a maximum number of HARQ-ACK information bit.

In an embodiment, the maximum number of HARQ-ACK information bit refers to a maximum number of HARQ-ACK information bit related to SPS in an uplink signal.

In an embodiment, the maximum number of HARQ-ACK information bit is indicated by RRC signaling, or the maximum number of HARQ-ACK information bit is related to a capacity of the first feedback signal.

In at least one embodiment, that the generating unit 701 generates a first feedback signal at least according to a first set includes:

that the generating unit 701 generates the first feedback signal according to the first set and a maximum number of ACKs related to the HARQ-ACK information.

In an embodiment, the HARQ-ACK information is HARQ-ACK information related to the SPS.

In an embodiment, the maximum number of ACKs related to the HARQ-ACK information is indicated by RRC signaling, or is predefined.

In at least one embodiment, the first feedback signal includes only feedback information to which PDSCH receptions in the SPS PDSCH receptions in the first set not corresponding to PDCCHs correspond.

In at least one embodiment, that the transmitting unit 702 transmits the first feedback signal includes:

that the transmitting unit 702 transmits the first feedback signal by using a first uplink resource, the first uplink resource being an uplink resource to which an SPS PDSCH reception in the first set corresponds.

In an embodiment, the SPS PDSCH reception to which the first uplink resource corresponds is at least one of the following:

an SPS PDSCH reception with a maximum or minimum SPS configuration ID to which the SPS PDSCH receptions in the first set correspond;

an SPS PDSCH reception with an earliest or latest PDSCH starting time-domain position or ending time-domain position to which the SPS PDSCH receptions in the first set correspond;

an SPS PDSCH reception with an earliest or latest PUCCH starting time-domain position or ending time-domain position to which the SPS PDSCH receptions in the first set correspond;

an SPS PDSCH reception with a PUCCH satisfying a predefined timeline to which the SPS PDSCH receptions in the first set correspond;

an SPS PDSCH reception with a PUCCH capacity greater than or equal to a corresponding total payload size to which the SPS PDSCH receptions in the first set correspond; and an SPS PDSCH reception with a largest PUCCH capacity to which the SPS PDSCH receptions in the first set correspond.

In at least one embodiment, that the transmitting unit 702 transmits the first feedback signal includes:

that the transmitting unit 702 transmits the first feedback signal by using a second uplink resource, the second uplink resource belonging to a second set, and the second uplink resource being related to a size of the HARQ-ACK information to which the SPS PDSCH receptions in the first set correspond.

In an embodiment, uplink resources in the second set are arranged in an ascending order or descending order of resource capacities.

In an embodiment, that the transmitting unit 702 transmits the first feedback signal by using a second uplink resource includes:

that the transmitting unit 702 transmits the first feedback signal by using the second uplink resource according to RRC signaling.

In at least one embodiment, that the transmitting unit 702 transmits the first feedback signal includes: that the transmitting unit 702 transmits the first feedback signal according to the RRC signaling.

In at least one embodiment, that the transmitting unit 702 transmits the first feedback signal includes: that the transmitting unit 702 transmits the first feedback signal according to a reported user equipment capability (UE capability).

With the apparatus of the embodiment of this disclosure, the network device may configure multiple SPSs (more flexible period, starting position) in the same BWP or CC or serving cell or the same BWP of the same serving cell more flexibly, and latency of SPS transmission feedback information may be lowered.

Embodiment of the Fourth Aspect

The embodiment of the fourth aspect of this disclosure provides a signal reception apparatus, configured in a network device. As principles of the apparatus for solving problems are similar to that of the method of the embodiment of the second aspect, reference may be made to the implementations of the method of the embodiment of the second aspect for implementations of this apparatus, with identical parts being not going to be described herein any further.

Figure 8:
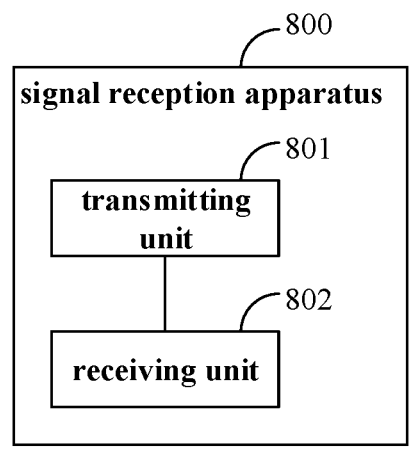
FIG. 8 is a schematic diagram of the signal reception apparatus of the fourth aspect of the embodiments of this disclosure.

FIG. 8 is a schematic diagram of the signal reception apparatus 800 of this embodiment. As shown in FIG. 8, the apparatus 800 includes: a transmitting unit 801 and a receiving unit 802. The transmitting unit 801 transmits SPS configuration information to a terminal equipment; and the receiving unit 802, at least according to a third set, receives a second feedback signal transmitted by the terminal equipment, the third set at least including feedback information to which two SPS PDSCH transmissions correspond, the SPS PDSCH transmissions corresponding to identical bandwidth parts (BWPs) or component carriers (CCs) or serving cells or identical BWPs of identical serving cells, and the SPS PDSCH transmissions corresponding to the SPS configuration information.

In the embodiment of this disclosure, the SPS PDSCH transmission refers to that the network device transmits a corresponding PDSCH according to a content indicated by the transmitted SPS activated DCI and corresponding SPS configuration information.

In the embodiment of this disclosure, the SPS PDSCH transmission in the third set corresponds to identical HARQ-ACK codebooks.

In an embodiment, that the SPS PDSCH transmission in the third set corresponds to identical HARQ-ACK codebooks refers to:

HARQ-ACK codebook identifiers of the SPS configuration to which the SPS PDSCH transmission in the third set corresponds are identical; or HARQ-ACK codebook identifiers in the SPS activated DCI to which the SPS PDSCH transmission in the third set corresponds are identical.

In the embodiment of this disclosure, the second feedback signal includes HARQ-ACK information to which the SPS PDSCH transmission in the third set corresponds, and the order of the feedback information to which the SPS PDSCH transmission in the third set corresponds in the third feedback signal is related to at least one of the following modes:

a sequential order of a starting time-domain position or an ending time-domain position of a PDSCH to which the SPS PDSCH transmission in the third set corresponds;

an ascending order or descending order of SPS configuration IDs to which the SPS PDSCH transmission in the third set corresponds; and a sequential order of a starting time-domain position or an ending time-domain position of the SPS activated DCI to which the SPS PDSCH transmission in the third set corresponds.

In the embodiment of this disclosure, the HARQ-ACK information to which the SPS PDSCH transmission in the third set corresponds is transmitted in the same sub-slot.

In an embodiment of the embodiment of this disclosure, that the receiving unit 802 receives the second feedback signal according to at least the third set includes:

that the receiving unit 802 receives the second feedback signal according to the third set and a maximum number of HARQ-ACK information bits.

In an embodiment, the maximum number of HARQ-ACK information bits refers to a maximum number of HARQ-ACK information bits related to the SPS in an uplink signal.

In an embodiment, the maximum number of HARQ-ACK information bits is indicated by RRC signaling, or the maximum number of HARQ-ACK information bits is related to a capacity of the second feedback signal.

In another embodiment of the embodiments of this disclosure, that the receiving unit 802 receives the second feedback signal at least according to the third set includes:
that the receiving unit 802 receives the second feedback signal according to the third set and a maximum number of ACKs related to the HARQ-ACK information.

In an embodiment, the above HARQ-ACK information is HARQ-ACK information related to the SPS.

In an embodiment, the maximum number of ACKs related to the HARQ-ACK information is indicated by RRC signaling, or is predefined.

In a further embodiment of the embodiment of this disclosure, that the receiving unit 802 receives the second feedback signal includes:
that the receiving unit 802 receives the second feedback signal on a third uplink resource, the third uplink resource being an uplink resource to which a SPS PDSCH transmission in the third set corresponds.

In an embodiment, the SPS PDSCH transmission to which the third uplink resource corresponds is at least one of the following:
an SPS PDSCH transmission with a maximum or minimum SPS configuration ID to which the SPS PDSCH transmission in the third set corresponds;
an SPS PDSCH transmission with an earliest or latest PDSCH starting time-domain position or ending time-domain position to which the SPS PDSCH transmission in the third set corresponds;
an SPS PDSCH transmission with an earliest or latest PUCCH starting time-domain position or ending time-domain position to which the SPS PDSCH transmission in the third set corresponds;
an SPS PDSCH transmission with a maximum or minimum SPS configuration ID to which the SPS PDSCH transmission in the third set corresponds;
an SPS PDSCH transmission with a PUCCH satisfying a predefined timeline to which the SPS PDSCH transmission in the third set corresponds;
an SPS PDSCH transmission with a PUCCH capacity greater than or equal to a corresponding total payload size to which the SPS PDSCH transmission in the third set corresponds; and
an SPS PDSCH transmission with a largest PUCCH capacity to which the SPS PDSCH transmission in the third set corresponds.

In yet another embodiment of the embodiments of this disclosure, that the receiving unit 802 receives the second feedback signal includes:
that the receiving unit 802 receives the second feedback signal on a fourth uplink resource, the fourth uplink resource belonging to a fourth set and being related to a size of the HARQ-ACK information to which the SPS PDSCH transmission in the third set corresponds.

In an embodiment, uplink resources in the fourth set are arranged in an ascending order or descending order of resource capacities.

In another embodiment, that the receiving unit 802 receives the second feedback signal on the fourth uplink resource includes:
that the receiving unit 802 receives the second feedback signal on the fourth uplink resource according to RRC signaling.

In an embodiment of the embodiments of this disclosure, the second feedback signal only includes HARQ-ACK information to which PDSCH transmissions in SPS PDSCH transmissions in the third set not corresponding to PDCCHs correspond.

In yet a further embodiment of the embodiments of this disclosure, that the receiving unit 802 receives the second feedback signal includes:
that the receiving unit 802 receives the second feedback signal according to RRC signaling.

In another embodiment of the embodiments of this disclosure, that the receiving unit 802 receives the second feedback signal includes:
that the receiving unit 802 receives the second feedback signal according to a received user equipment capability (UE capability).

With the apparatus of the embodiment of this disclosure, the network device may configure multiple SPSs (more flexible period, starting position) in the same BWP or CC or serving cell or the same BWP of the same serving cell more flexibly, and latency of SPS transmission feedback information may be lowered.

Embodiment of the Fifth Aspect

The embodiment of the fifth aspect of this disclosure provides a terminal equipment, including the apparatus as described in the embodiment of the third aspect.

Figure 9:
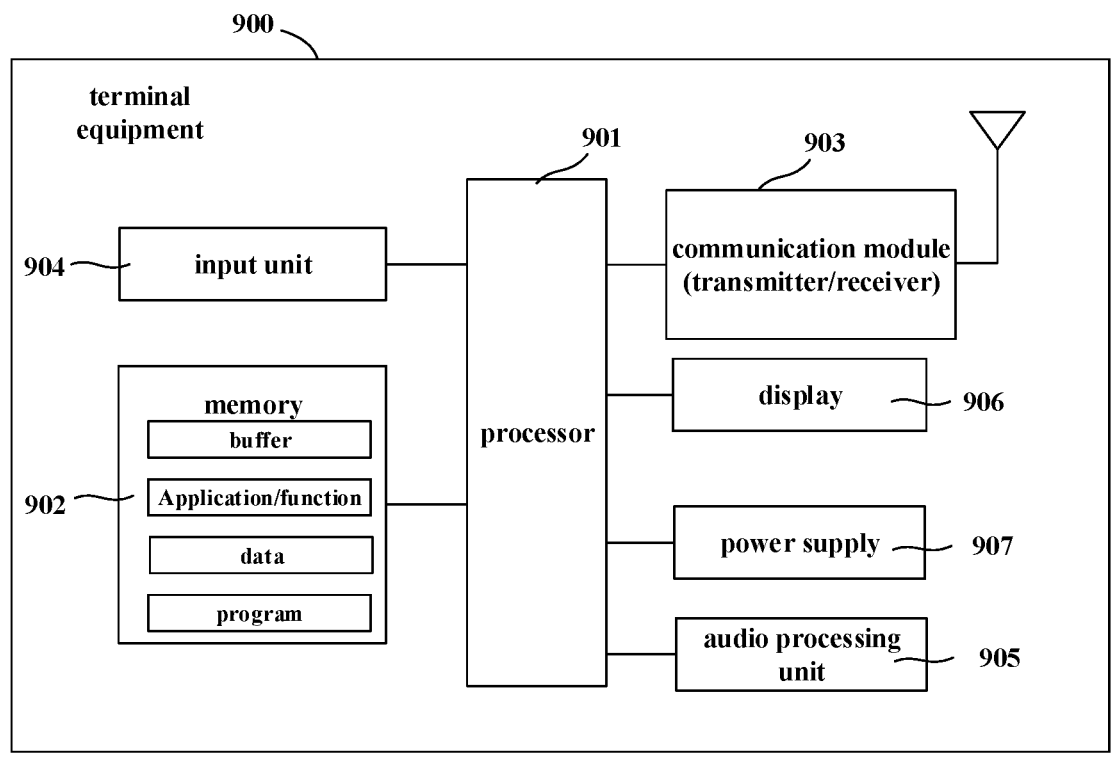
FIG. 9 is a schematic diagram of the terminal equipment of the fifth aspect of the embodiments of this disclosure.

FIG. 9 is a schematic diagram of the terminal equipment of the fifth aspect of the embodiments of this disclosure. As shown in FIG. 9, the terminal equipment 900 may include a central processing unit 901 and a memory 902, the memory 902 being coupled to the central processing unit 901. It should be noted that this figure is illustrative only, and other types of structures may also be used, so as to supplement or replace this structure and achieve a telecommunications function or other functions.

In one embodiment, the functions of the apparatus described in the embodiment of the third aspect may be integrated into the central processing unit 901, and the central processing unit 901 achieves functions of the apparatus described in the embodiment of the third aspect. The functions of the apparatus described in the embodiment of the third aspect are incorporated herein, and shall not be described herein any further.

In another embodiment, the apparatus described in the embodiment of the third aspect and the central processing unit 901 may be configured separately; for example, the apparatus described in the embodiment of the third aspect may be configured as a chip connected to the central processing unit 901, and the functions of the apparatus described in the embodiment of the third aspect are achieved under control of the central processing unit 901.

As shown in FIG. 9, the terminal equipment 900 may further include a communication module 903, an input unit 904, an audio processing unit 905, a display 906 and a power supply 907. It should be noted that the terminal equipment 900 does not necessarily include all the parts shown in FIG. 9. Furthermore, the terminal equipment 900 may include parts not shown in FIG. 9, and the related art may be referred to.

As shown in FIG. 9, the central processing unit 901 is sometimes referred to as a controller or an operational control, which may include a microprocessor or other processor devices and/or logic devices. The central processing unit 901 receives input and controls operations of components of the terminal equipment 900.

The memory 902 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 901 may execute programs stored in the memory 902, so as to realize information storage or processing, etc. Functions of other parts are similar to those of the related art, which shall not be described herein any further. The parts of the terminal equipment 900 may be realized by specific hardware, firmware, software, or any combination thereof, without departing from the scope of this disclosure.

With the terminal equipment of this embodiment, the network device may configure multiple SPSs (more flexible period, starting position) in the same BWP or CC or serving cell or the same BWP of the same serving cell more flexibly, and latency of SPS transmission feedback information may be lowered.

Embodiment of the Sixth Aspect

The embodiment of the sixth aspect provides a network device, including the apparatus described in the embodiment of the fourth aspect.

Figure 10:
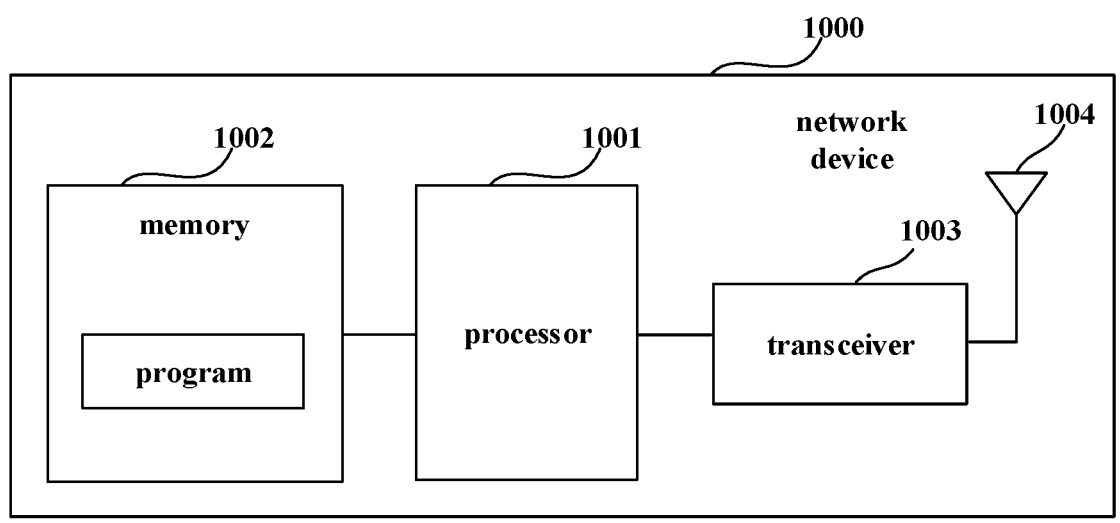
FIG. 10 is a schematic diagram of the network device of the sixth aspect of the embodiments of this disclosure.

FIG. 10 is a schematic diagram of the network device of the embodiment of the sixth aspect. As shown in FIG. 10, the network device 1000 may include a central processing unit (CPU) 1001 and a memory 1002, the memory 1002 being coupled to the central processing unit 1001. The memory 1002 may store various data, and furthermore, it may store a program for data processing, and execute the program under control of the central processing unit 1001, so as to receive various information transmitted by a terminal equipment, and transmit various information to the terminal equipment.

In one embodiment, the functions of the apparatus described in the embodiment of the fourth aspect may be integrated into the central processing unit 1001, and the central processing unit 1001 achieves functions of the apparatus described in the embodiment of the fourth aspect. The functions of the apparatus described in the embodiment of the fourth aspect are incorporated herein, and shall not be described herein any further.

In another embodiment, the apparatus described in the embodiment of the fourth aspect and the central processing unit 1001 may be configured separately; for example, the apparatus described in the embodiment of the fourth aspect may be configured as a chip connected to the central processing unit 1001, and the functions of the apparatus described in the embodiment of the fourth aspect are executed under control of the central processing unit 1001.

Furthermore, as shown in FIG. 10, the network device 1000 may include a transceiver 1003, and an antenna 1004, etc. Functions of the above components are similar to those in the related art, and shall not be described herein any further. It should be noted that the network device 1000 does not necessarily include all the parts shown in FIG. 10. Furthermore, the network device 1000 may include parts not shown in FIG. 10, and the related art may be referred to.

With the network device of this embodiment, the network device may configure multiple SPSs (more flexible period, starting position) in the same BWP or CC or serving cell or the same BWP of the same serving cell more flexibly, and latency of SPS transmission feedback information may be lowered.

Embodiment of the Seventh Aspect

The embodiment of the seventh aspect provides a communication system, including a network device and a terminal equipment. The network device is, for example, the network device 1000 described in the embodiment of the sixth aspect, and the terminal equipment is, for example, the terminal equipment 900 described in the embodiment of the fifth aspect.

In this embodiment, the terminal equipment is, for example, a UE served by a gNB, and may include conventional compositions and functions of a terminal equipment in addition to the functions of the apparatus described in the embodiment of the third aspect, which are as described in the embodiment of the fifth aspect, and shall not be described herein any further.

In this embodiment, the network device may be, for example, a gNB in NR, and may include conventional compositions and functions of a network device in addition to the functions of the apparatus described in the embodiment of the fourth aspect, which are as described in the embodiment of the sixth aspect, and shall not be described herein any further.

With the communication system of this embodiment, the network device may configure multiple SPSs (more flexible period, starting position) in the same BWP or CC or serving cell or the same BWP of the same serving cell more flexibly, and latency of SPS transmission feedback information may be lowered.

An embodiment of this disclosure provides a computer readable program, which, when executed in a terminal equipment, will cause a computer to carry out the method described in the embodiment of the first aspect in the terminal equipment.

An embodiment of this disclosure provides a storage medium storing a computer readable program, which will cause a computer to carry out the method described in the embodiment of the first aspect in a terminal equipment.

An embodiment of this disclosure provides a computer readable program, which, when executed in a network device, will cause a computer to carry out the method described in the embodiment of the second aspect in the network device.

An embodiment of this disclosure provides a storage medium storing a computer readable program, which will cause a computer to carry out the method described in the embodiment of the second aspect in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 7 and 8 may either correspond to software modules of procedures of a computer program, or correspond to hardware modules. Such software modules may respectively correspond to the steps shown in FIGS. 3 and 6. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to the above implementations disclosed in the embodiments, following supplements are further disclosed.

1. A signal transmission apparatus, configured in a terminal equipment, wherein the apparatus includes:
  a generating unit configured to generate a first feedback signal at least according to a first set, the first set at least including two SPS PDSCH receptions, and the SPS PDSCH receptions in the first set corresponding to identical bandwidth parts (BWPs) or component carriers or serving cells or identical BWPs of identical serving cells; and
  a transmitting unit configured to transmit the first feedback signal.

2. The apparatus according to supplement 1, wherein the SPS PDSCH receptions refer to that the terminal equipment monitors or receives corresponding PDSCHs according to an SPS activated DCI indication and corresponding SPS configuration information.

3. The apparatus according to supplement 1, wherein the SPS PDSCH receptions in the first set correspond to identical HARQ-ACK codebooks.

4. The apparatus according to supplement 3, wherein that the SPS PDSCH receptions in the first set correspond to identical HARQ-ACK codebooks refers to:
  HARQ-ACK codebook identifications of the SPS configuration to which the SPS PDSCH receptions in the first set correspond are identical; or
  HARQ-ACK codebook identifications in the SPS activated DCI to which the SPS PDSCH receptions in the first set correspond are identical.

5. The apparatus according to supplement 1, wherein the first feedback signal includes HARQ-ACK information to which the SPS PDSCH receptions in the first set correspond, and orders of the feedback information to which the SPS PDSCH receptions in the first set correspond in the first feedback signal are related to at least one of the following manners:
  a sequential order of starting time-domain positions or ending time-domain positions of PDSCHs to which the SPS PDSCH receptions in the first set correspond;
  an ascending order or descending order of SPS configuration IDs to which the SPS PDSCH receptions in the first set correspond; and
  a sequential order of starting time-domain positions or ending time-domain positions of SPS activated DCI to which the SPS PDSCH receptions in the first set correspond.

6. The apparatus according to supplement 1 or 5, wherein the HARQ-ACK information to which the SPS PDSCH receptions in the first set correspond is transmitted in identical sub-slots.

7. The apparatus according to supplement 1, wherein that the generating unit generates a first feedback signal at least according to a first set includes:
  that the generating unit generates the first feedback signal according to the first set and a maximum number of HARQ-ACK information bit.

8. The apparatus according to supplement 7, wherein the maximum number of HARQ-ACK information bit refers to a maximum number of HARQ-ACK information bit related to SPS in an uplink signal.

9. The apparatus according to supplement 7, wherein the maximum number of HARQ-ACK information bit is indicated by RRC signaling, or the maximum number of HARQ-ACK information bit is related to a capacity of the first feedback signal.

10. The apparatus according to supplement 1, wherein that the generating unit generates a first feedback signal at least according to a first set includes:
  that the generating unit generates the first feedback signal according to the first set and a maximum number of ACKs related to the HARQ-ACK information.

11. The apparatus according to supplement 10, wherein the HARQ-ACK information is HARQ-ACK information related to the SPS.

12. The apparatus according to supplement 10, wherein the maximum number of ACKs related to the HARQ-ACK information is indicated by RRC signaling, or is predefined.

13. The apparatus according to supplement 1, wherein that the transmitting unit transmits the first feedback signal includes:
  that the transmitting unit transmits the first feedback signal by using a first uplink resource, the first uplink resource being an uplink resource to which an SPS PDSCH reception in the first set corresponds.

14. The apparatus according to supplement 13, wherein the SPS PDSCH reception to which the first uplink resource corresponds is at least one of the following:
  an SPS PDSCH reception with a maximum or minimum SPS configuration ID to which the SPS PDSCH receptions in the first set correspond;
  an SPS PDSCH reception with an earliest or latest PDSCH starting time-domain position or ending time-domain position to which the SPS PDSCH receptions in the first set correspond;

an SPS PDSCH reception with an earliest or latest PUCCH starting time-domain position or ending time-domain position to which the SPS PDSCH receptions in the first set correspond;

an SPS PDSCH reception with a PUCCH satisfying a predefined timeline to which the SPS PDSCH receptions in the first set correspond;

an SPS PDSCH reception with a PUCCH capacity greater than or equal to a corresponding total payload size to which the SPS PDSCH receptions in the first set correspond; and an SPS PDSCH reception with a largest PUCCH capacity to which the SPS PDSCH receptions in the first set correspond.

15. The apparatus according to supplement 1, wherein that the transmitting unit transmits the first feedback signal includes:

that the transmitting unit transmits the first feedback signal by using a second uplink resource, the second uplink resource belonging to a second set, and the second uplink resource being related to a size of the HARQ-ACK information to which the SPS PDSCH receptions in the first set correspond.

16. The apparatus according to supplement 15, wherein uplink resources in the second set are arranged in an ascending order or descending order of resource capacities.

17. The apparatus according to supplement 15, wherein that the transmitting unit transmits the first feedback signal by using a second uplink resource includes:

that the transmitting unit transmits the first feedback signal by using the second uplink resource according to RRC signaling.

18. The apparatus according to supplement 1 or 13 or 15, wherein the first feedback signal includes only HARQ-ACK information to which a PDSCH reception in the SPS PDSCH receptions in the first set corresponds, the PDSCH reception not corresponding to a PDCCH.

19. The apparatus according to supplement 1, wherein that the transmitting unit transmits the first feedback signal includes:

that the transmitting unit transmits the first feedback signal according to RRC signaling.

20. The apparatus according to supplement 1, wherein that the transmitting unit transmits the first feedback signal includes:

that the transmitting unit transmits the first feedback signal according to a reported UE capability.

21. A signal reception apparatus, configured in a network device, wherein the apparatus includes:

a transmitting unit configured to transmit SPS configuration information to a terminal equipment; and a receiving unit configured to, at least according to a third set, receive a second feedback signal transmitted by the terminal equipment, the third set at least including two SPS PDSCH transmissions, the SPS PDSCH transmissions corresponding to identical bandwidth parts (BWPs) or component carriers (CCs) or serving cells or identical BWPs of identical serving cells, and the SPS PDSCH transmissions corresponding to the SPS configuration information.

22. The apparatus according to supplement 21, wherein the SPS PDSCH transmission refers to that the network device is able to transmit a corresponding PDSCH according to a content indicated by transmitted SPS activated DCI and corresponding SPS configuration information.

23. The apparatus according to supplement 21, wherein the SPS PDSCH transmission in the third set corresponds to the same HARQ-ACK codebook.

24. The apparatus according to supplement 23, wherein that the SPS PDSCH transmission in the third set corresponds to identical codebooks refers to:

HARQ-ACK codebook identifiers of the SPS configuration to which the SPS PDSCH transmission in the third set corresponds are identical; or HARQ-ACK codebook identifiers in the SPS activated DCI to which the SPS PDSCH transmission in the third set corresponds are identical.

25. The apparatus according to supplement 21, wherein the second feedback signal includes HARQ-ACK information to which the SPS PDSCH transmission in the third set corresponds, and an order of the feedback information to which the SPS PDSCH transmission in the third set corresponds in the third feedback signal is related to at least one of the following modes:

a sequential order of a starting time-domain position or an ending time-domain position of a PDSCH to which the SPS PDSCH transmission in the third set corresponds;

an ascending order or descending order of SPS configuration IDs to which the SPS PDSCH transmission in the third set corresponds; and a sequential order of a starting time-domain position or an ending time-domain position of the SPS activated DCI to which the SPS PDSCH transmission in the third set corresponds.

26. The apparatus according to supplement 21 or 25, wherein the HARQ-ACK information to which the SPS PDSCH transmission in the third set corresponds is transmitted in identical sub-slots.

27. The apparatus according to supplement 21, wherein that the receiving unit receives the second feedback signal at least according to the third set includes:

that the receiving unit receives the second feedback signal according to the third set and a maximum number of HARQ-ACK information bits.

28. The apparatus according to supplement 27, wherein the maximum number of HARQ-ACK information bits refers to: a maximum number of HARQ-ACK information bits related to SPS in an uplink signal.

29. The apparatus according to supplement 27, wherein the maximum number of HARQ-ACK information bits is indicated by RRC signaling, or the maximum number of HARQ-ACK information bits is related to a capacity of the second feedback signal.

30. The apparatus according to supplement 21, wherein that the receiving unit receives the second feedback signal at least according to the third set includes:

that the receiving unit receives the second feedback signal according to the third set and a maximum number of ACKs related to the HARQ-ACK information.

31. The apparatus according to supplement 30, wherein the HARQ-ACK information is HARQ-ACK information related to the SPS.

32. The apparatus according to supplement 30, wherein the maximum number of ACKs related to HARQ-ACK information is indicated by RRC signaling, or is predefined.

33. The apparatus according to supplement 21, wherein that the receiving unit receives the second feedback signal includes:

that the receiving unit receives the second feedback signal on a third uplink resource, the third uplink resource being an uplink resource to which a SPS PDSCH transmission in the third set corresponds.

34. The apparatus according to supplement 33, wherein the SPS PDSCH transmission to which the third uplink resource corresponds is at least one of the following:
- an SPS PDSCH transmission with a maximum or minimum SPS configuration ID to which the SPS PDSCH transmission in the third set corresponds;
- an SPS PDSCH transmission with an earliest or latest PDSCH starting time-domain position or ending time-domain position to which the SPS PDSCH transmission in the third set corresponds;
- an SPS PDSCH transmission with an earliest or latest PUCCH starting time-domain position or ending time-domain position to which the SPS PDSCH transmission in the third set corresponds;
- an SPS PDSCH transmission with a PUCCH satisfying a predefined timeline to which the SPS PDSCH transmission in the third set corresponds;
- an SPS PDSCH transmission with a PUCCH capacity greater than or equal to a corresponding total payload size to which the SPS PDSCH transmission in the third set corresponds; and
- an SPS PDSCH transmission with a largest PUCCH capacity to which the SPS PDSCH transmission in the third set corresponds.

35. The apparatus according to supplement 21, wherein that the receiving unit receives the second feedback signal includes:
- that the receiving unit receives the second feedback signal on a fourth uplink resource, the fourth uplink resource belonging to a fourth set and being related to a size of the HARQ-ACK information to which the SPS PDSCH transmission in the third set corresponds.

36. The apparatus according to supplement 35, wherein uplink resources in the fourth set are arranged in an ascending order or descending order of resource capacities.

37. The apparatus according to supplement 35, wherein that the receiving unit receives the second feedback signal on a fourth uplink resource includes:
- that the receiving unit receives the second feedback signal on the fourth uplink resource according to RRC signaling.

38. The apparatus according to supplement 21 or 33 or 35, wherein the second feedback signal only includes HARQ-ACK information to which PDSCH transmissions in SPS PDSCH transmissions in the third set not corresponding to PDCCHs correspond.

39. The apparatus according to supplement 21, wherein that the receiving unit receives the second feedback signal includes:
- that the receiving unit receives the second feedback signal according to RRC signaling.

40. The apparatus according to supplement 21, wherein that the receiving unit receives the second feedback signal includes:
- that the receiving unit receives the second feedback signal according to a received user equipment capability (UE capability).

41. A communication system, including a network device and a terminal equipment, wherein the network device includes the apparatus as described in any one of supplements 21-40, and the terminal equipment includes the apparatus as described in any one of supplements 1-20.

What is claimed is:

1. A signal transmission apparatus having a processor and memory, configured in a terminal equipment, wherein the apparatus comprises:
- a generator configured to generate a first feedback signal at least according to a first set, the first set at least comprising two SPS PDSCH receptions, and the SPS PDSCH receptions in the first set corresponding to identical serving cells; and
- a transmitter configured to transmit the first feedback signal,
- wherein the first feedback signal comprises HARQ-ACK information to which the SPS PDSCH receptions in the first set correspond, and orders of the feedback information to which the SPS PDSCH receptions in the first set correspond in the first feedback signal are related to at least one of the following manners:
  - an ascending order of ending time-domain positions of PDSCHs to which the SPS PDSCH receptions in the first set correspond; and
  - an ascending order of SPS configuration IDs to which the SPS PDSCH receptions in the first set correspond.

2. The apparatus according to claim 1, wherein the SPS PDSCH receptions refer to that the terminal equipment monitors or receives corresponding PDSCHs according to an SPS activated DCI indication and corresponding SPS configuration information.

3. The apparatus according to claim 1, wherein the SPS PDSCH receptions in the first set correspond to identical HARQ-ACK codebooks.

4. The apparatus according to claim 3, wherein the SPS PDSCH receptions in the first set corresponding to identical HARQ-ACK codebooks refers to:
- HARQ-ACK codebook identifications of the SPS configuration to which the SPS PDSCH receptions in the first set correspond are identical; or
- HARQ-ACK codebook identifications in the SPS activated DCI to which the SPS PDSCH receptions in the first set correspond are identical.

5. The apparatus according to claim 1, wherein the HARQ-ACK information to which the SPS PDSCH receptions in the first set correspond is transmitted in identical sub-slots.

6. The apparatus according to claim 1, wherein the generator generating a first feedback signal at least according to a first set comprises:
- the generator generates the first feedback signal according to the first set and a maximum number of HARQ-ACK information bit.

7. The apparatus according to claim 6, wherein the maximum number of HARQ-ACK information bit refers to a maximum number of HARQ-ACK information bit related to SPS in an uplink signal.

8. The apparatus according to claim 6, wherein the maximum number of HARQ-ACK information bit is indicated by RRC signaling, or the maximum number of HARQ-ACK information bit is related to a capacity of the first feedback signal.

9. The apparatus according to claim 1, wherein the generator generating a first feedback signal at least according to a first set comprises:
- the generator generates the first feedback signal according to the first set and a maximum number of ACKs related to the HARQ-ACK information.

10. The apparatus according to claim 9, wherein the HARQ-ACK information is HARQ-ACK information related to the SPS.

11. The apparatus according to claim 9, wherein the maximum number of ACKs related to the HARQ-ACK information is indicated by RRC signaling, or is predefined.

12. A signal transmission apparatus having a processor and memory, configured in a terminal equipment, the signal transmission apparatus comprising:
  a generator configured to generate a first feedback signal at least according to a first set, the first set at least comprising two SPS PDSCH receptions, and the SPS PDSCH receptions in the first set corresponding to identical serving cells; and
  a transmitter configured to transmit the first feedback signal by using a first uplink resource, the first uplink resource being an uplink resource to which an SPS PDSCH reception in the first set corresponds, wherein the SPS PDSCH reception to which the first uplink resource corresponds is at least one of the following:
  an SPS PDSCH reception with a maximum or minimum SPS configuration ID to which the SPS PDSCH receptions in the first set correspond;
  an SPS PDSCH reception with an earliest or latest PDSCH starting time-domain position or the ending time-domain position to which the SPS PDSCH receptions in the first set correspond;
  an SPS PDSCH reception with an earliest or latest PUCCH starting time-domain position or the ending time-domain position to which the SPS PDSCH receptions in the first set correspond;
  an SPS PDSCH reception with a PUCCH satisfying a predefined timeline to which the SPS PDSCH receptions in the first set correspond;
  an SPS PDSCH reception with a PUCCH capacity greater than or equal to a corresponding total payload size to which the SPS PDSCH receptions in the first set correspond; and
  an SPS PDSCH reception with a largest PUCCH capacity to which the SPS PDSCH receptions in the first set correspond.

13. The apparatus according to claim 1, wherein the transmitter transmitting the first feedback signal comprises:
  the transmitter transmits the first feedback signal by using a second uplink resource, the second uplink resource belonging to a second set, and the second uplink resource being related to a size of the HARQ-ACK information bits to which the SPS PDSCH receptions in the first set correspond.

14. The apparatus according to claim 13, wherein the transmitter transmitting the first feedback signal by using a second uplink resource comprises:
  the transmitter transmits the first feedback signal by using the second uplink resource according to RRC signaling.

15. The apparatus according to claim 1, wherein the first feedback signal comprises only HARQ-ACK information to which a PDSCH reception in the SPS PDSCH receptions in the first set corresponds, the PDSCH reception not corresponding to a PDCCH.

16. The apparatus according to claim 1, wherein the transmitter transmitting the first feedback signal comprises:
  the transmitter transmits the first feedback signal according to RRC signaling.

17. The apparatus according to claim 1, wherein the transmitter transmitting the first feedback signal comprises:
  the transmitter transmits the first feedback signal according to a reported UE capability.

* * * * *